United States Patent
Vega

(10) Patent No.: US 10,480,233 B2
(45) Date of Patent: Nov. 19, 2019

(54) HIDDEN SLIDING DOOR ASSEMBLY FOR A MOTOR VEHICLE

(71) Applicant: FORD GLOBAL TECHNOLOGIES, LLC, Dearborn, MI (US)

(72) Inventor: Daniel Vincent Vega, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 15/381,330

(22) Filed: Dec. 16, 2016

(65) Prior Publication Data

US 2018/0171693 A1    Jun. 21, 2018

(51) Int. Cl.
| *E05D 15/10* | (2006.01) |
| *B60J 5/12* | (2006.01) |
| *E05D 15/06* | (2006.01) |

(52) U.S. Cl.
CPC ............ *E05D 15/1081* (2013.01); *B60J 5/12* (2013.01); *E05D 15/0604* (2013.01); *E05D 15/0686* (2013.01); *E05D 15/101* (2013.01); *E05D 2015/1086* (2013.01); *E05Y 2201/624* (2013.01); *E05Y 2900/531* (2013.01)

(58) Field of Classification Search
CPC .............. E05D 15/1081; E05D 15/101; E05D 15/0686; E05D 2015/1084; E05D 2015/1085
See application file for complete search history.

(56) References Cited

U.S. PATENT DOCUMENTS

| 3,605,338 A * | 9/1971 | Grossbach | ................ B60J 5/06 |
| | | | 296/153 |
| 4,047,737 A * | 9/1977 | Grossbach | .............. B60R 22/04 |
| | | | 280/804 |
| 6,010,193 A | 1/2000 | Hara et al. | |
| 6,036,257 A * | 3/2000 | Manuel | ..................... B60J 5/06 |
| | | | 296/155 |
| 8,020,923 B2 | 9/2011 | Gaudig | |
| 8,794,688 B2 * | 8/2014 | Mather | ..................... B60J 5/06 |
| | | | 296/78.1 |
| 2009/0199480 A1 * | 8/2009 | Ehrhard | ................ B60J 5/0412 |
| | | | 49/212 |
| 2015/0203006 A1 | 7/2015 | Hipshier et al. | |
| 2015/0291014 A1 * | 10/2015 | Choi | ......................... B60J 5/06 |
| | | | 49/449 |

FOREIGN PATENT DOCUMENTS

| CN | 101153534 B | 9/2012 |
| DE | 102007030045 A1 | 4/2008 |
| JP | 2004284426 A | 10/2004 |
| JP | 2006188089 A | 7/2006 |

OTHER PUBLICATIONS

English Machine Translation of CN101153534B.
English Machine Translation of DE102007030045A1.
English Machine Translation of JP2004284426A.
English Machine Translation of JP2006188089A.

* cited by examiner

*Primary Examiner* — Gregory J Strimbu
(74) *Attorney, Agent, or Firm* — Jason Rogers; Vichit Chea; King & Schickli, PLLC

(57) ABSTRACT

A sliding door assembly includes a link arm connected to a support surface, a track guide carried on the link arm and a door body including a track that slides over the track guide. A related method of operating the sliding door assembly is also disclosed.

7 Claims, 4 Drawing Sheets

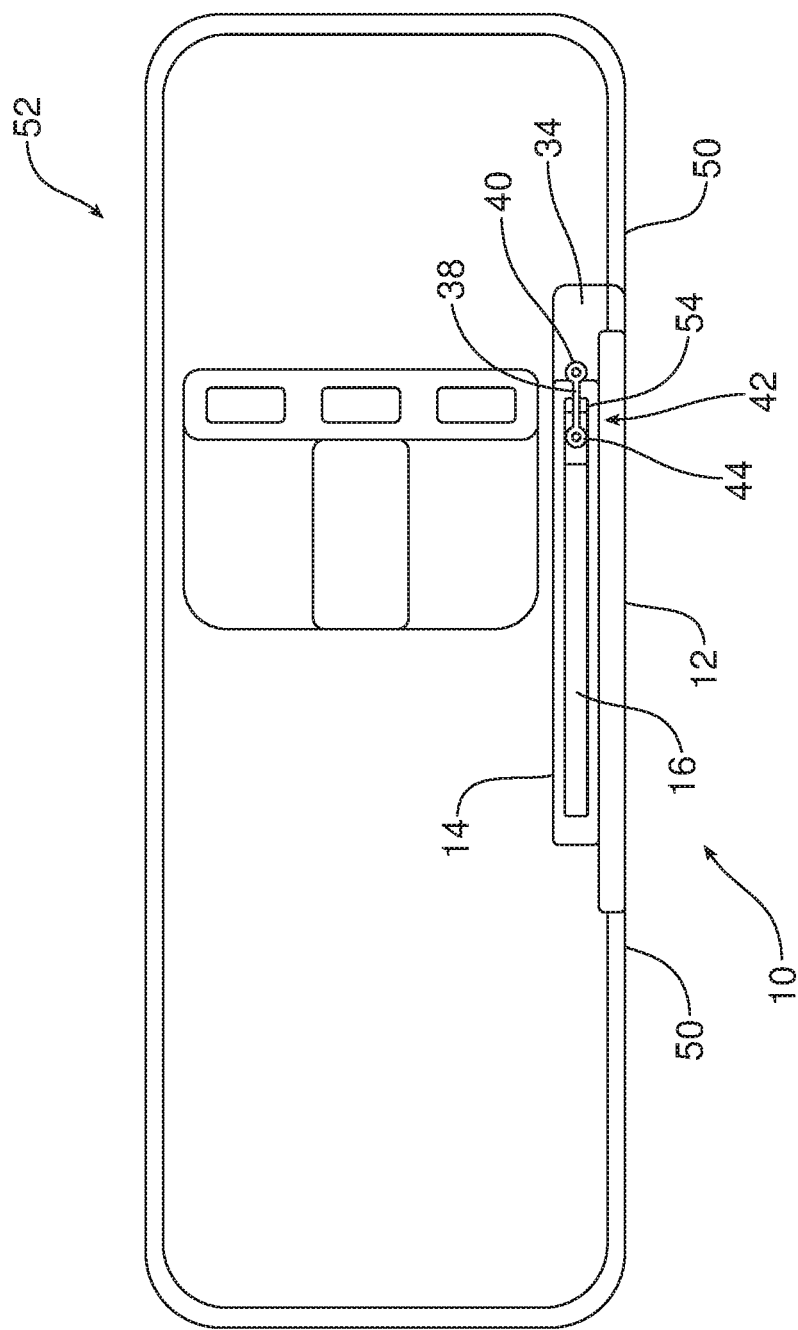

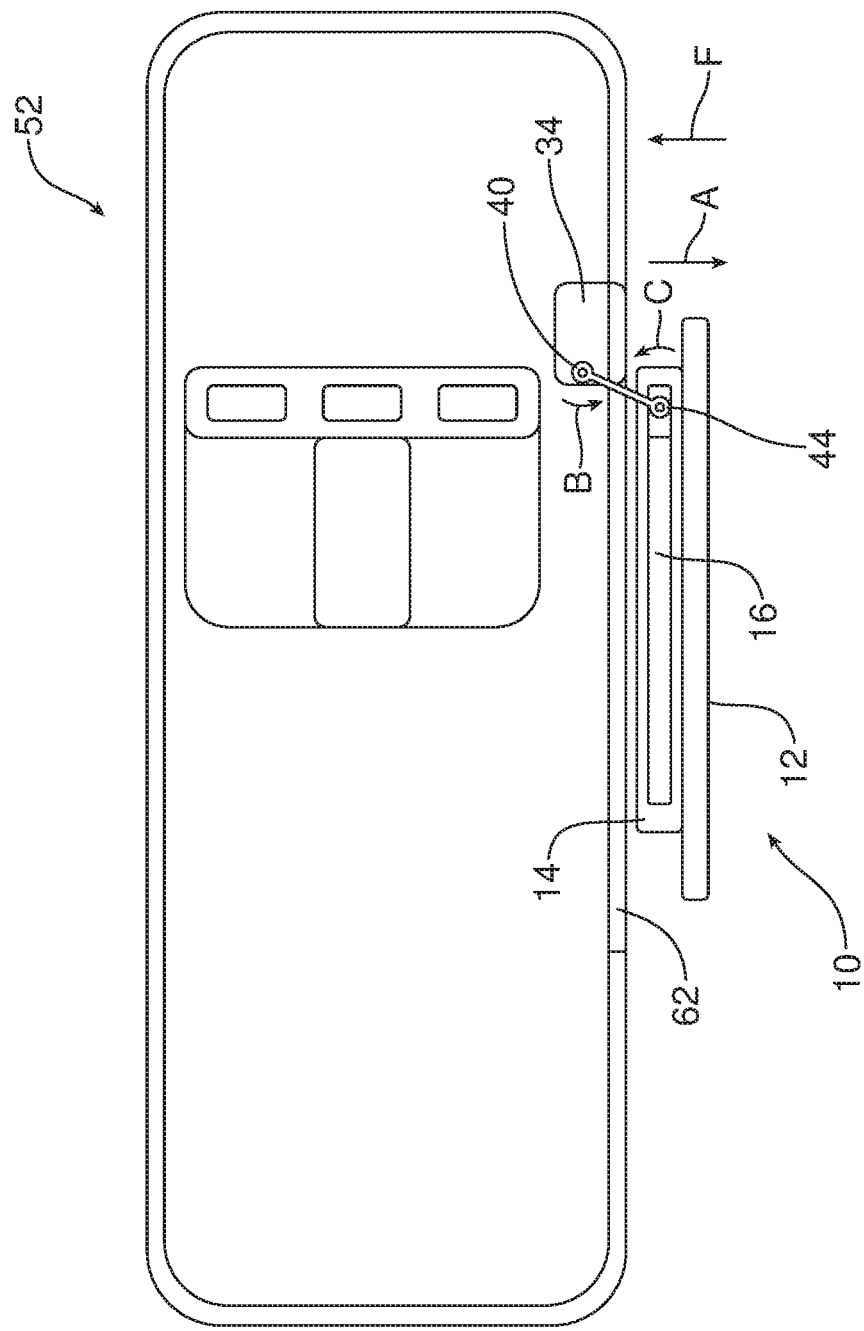

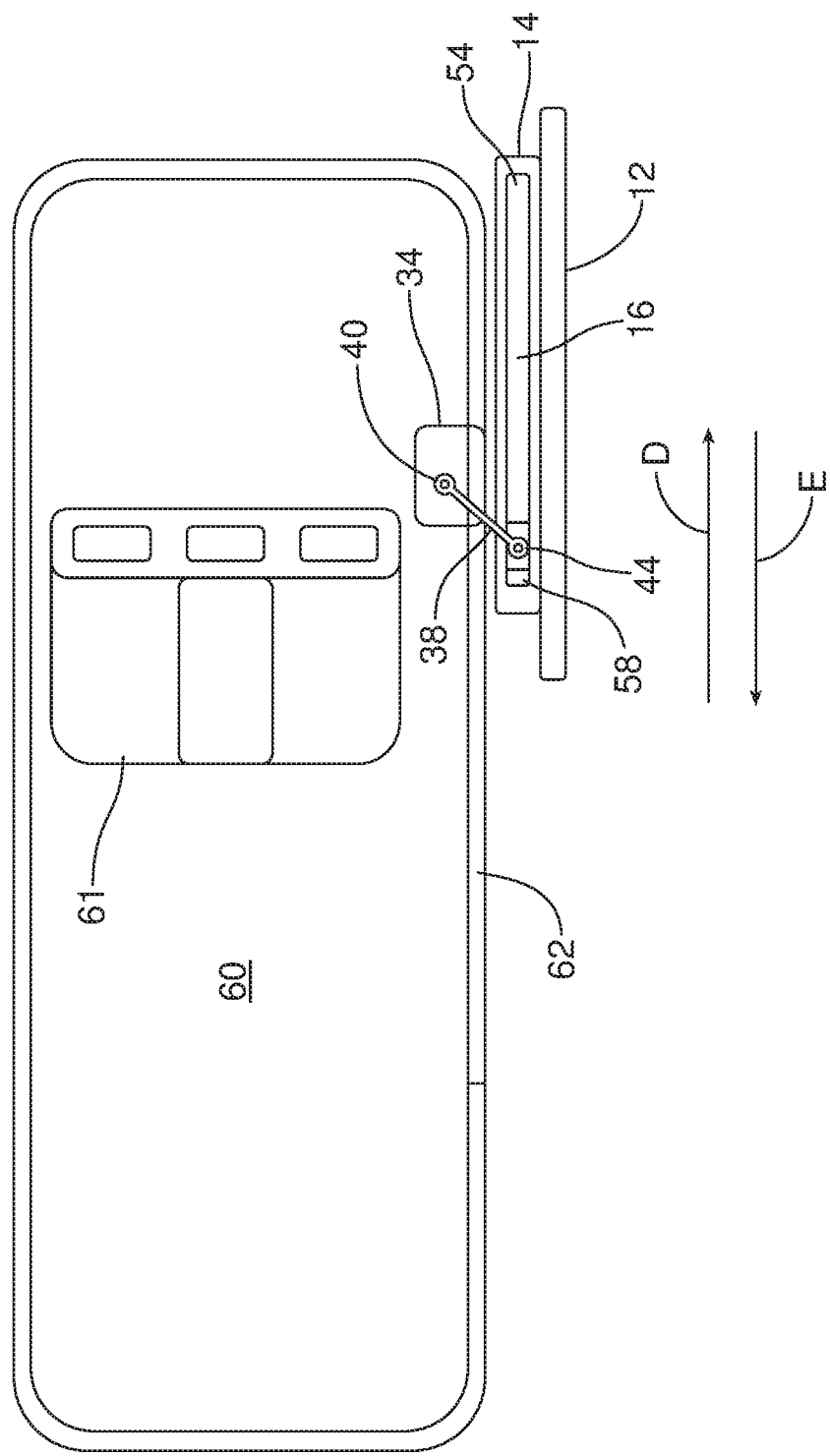

HIDDEN SLIDING DOOR ASSEMBLY FOR A MOTOR VEHICLE

TECHNICAL FIELD

Figure 1:
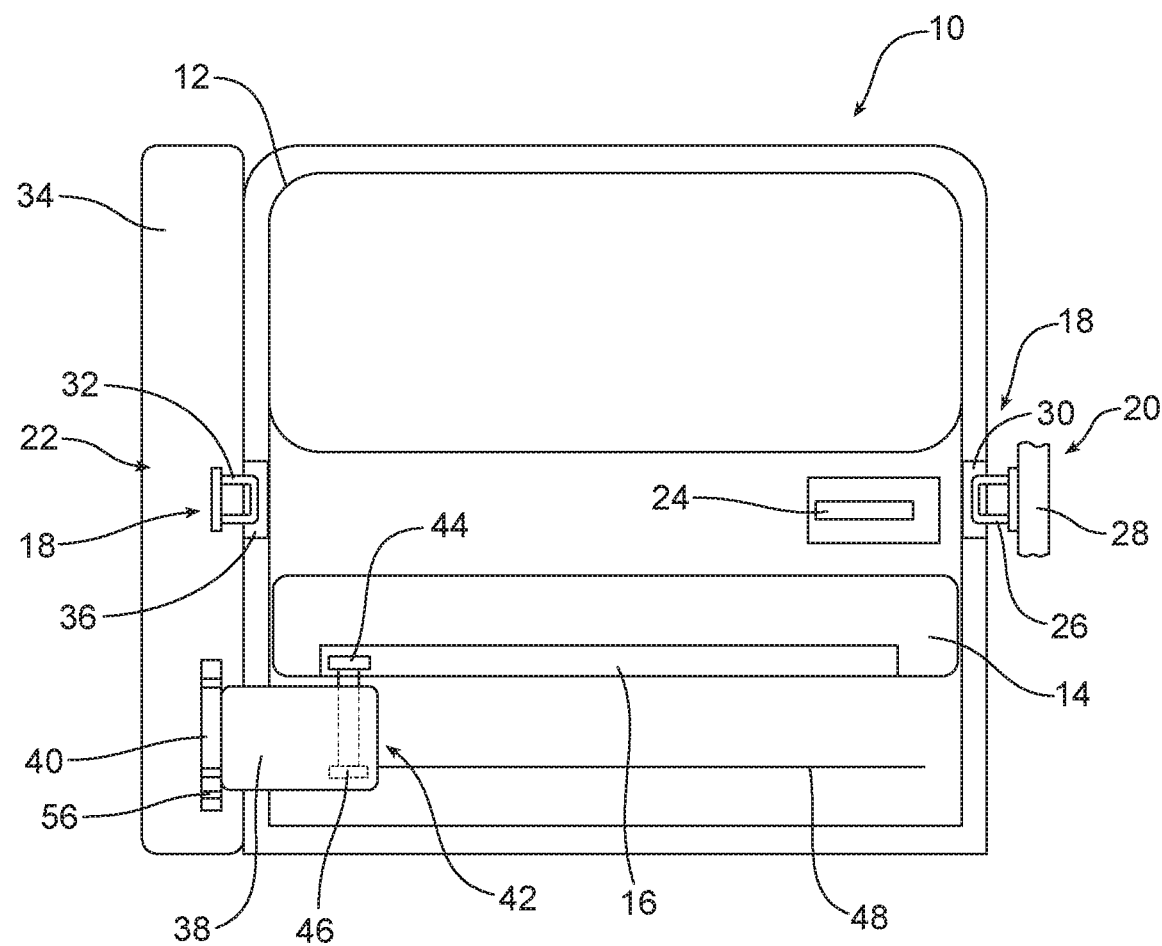

This document relates generally to the motor vehicle equipment field and, more particularly, to a hidden sliding door assembly as well as to a method of operating that sliding door assembly.

BACKGROUND

Sliding doors are extremely convenient on a motor vehicle. While an obstruction may limit how far a standard pivoting door may be opened to access the door opening, sufficient clearance will exist to fully open a sliding door.

State of the art sliding doors typically include an external track which provides a readily visible indication that the motor vehicle is equipped with a sliding door. For some, such a sliding door carries the stigma of a minivan or other utilitarian passenger or cargo vehicle. This document relates to a new and improved sliding door assembly wherein the external telltale track has been eliminated thereby allowing one to have the utilitarian convenience of a sliding door while simultaneously concealing that the door is a sliding door when the door is closed.

SUMMARY

In accordance with the purposes and benefits described herein, a sliding door assembly is provided. That sliding door assembly comprises a link arm connected to a support surface, a track guide carried on the link arm and a door body including a track that slides over the track guide.

The link arm may be connected to the support surface by a pivot connection or hinge. The support surface may comprise a structural pillar of a motor vehicle.

The track guide may include or comprise a roller mechanism. That roller mechanism may have a first roller engaging in the track on the door body. Further, that roller mechanism may have a second roller engaging the door body. In addition, a spring may be provided to bias the link arm from a home position toward a door sliding position.

The sliding door assembly may further include a locking mechanism. That locking mechanism may include a first door lock, a second door lock and an actuator handle. The first door lock may be a forward door lock and the second door lock may be a rearward door lock. The actuator handle may be carried on the door body and used to release the first door lock and the second door lock.

The door body may also include an arm rest. The track may be provided in the arm rest. More specifically, the track may be provided along a bottom portion of the arm rest and the track may open downward.

In accordance with an additional aspect, the sliding door assembly may comprise a door body, a track carried on an internal side of the door body and a track guide engaging the track. That track guide is carried on the motor vehicle and, more specifically, a link arm.

In accordance with yet another aspect, a method is provided of operating a sliding door assembly including a door body supported on a track guide carried on a link arm. That method comprises the steps of displacing the door body from a closed position to a first opened position by pivoting the link arm about a hinge connecting the link arm to a mounting surface on the motor vehicle and then sliding the door body over the track guide into a second opened position.

The method may further include the step of releasing a lock mechanism before displacing the door body and then sliding the door body. In addition, the method may include the step of displacing the door body from the second opened position to the closed position.

Toward this end the method may include sliding the door body over the track guide from the second opened position to the first opened position. This is then followed by the step of displacing the door body from the first opened position to the closed position by pivoting the link arm about the hinge.

In the following description, there are shown and described several preferred embodiments of the sliding door assembly as well the related method of operating the sliding door assembly. As it should be realized, the sliding door assembly and method are capable of other, different embodiments and their several details are capable of modification in various, obvious aspects all without departing from the sliding door assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the sliding door assembly and related method and together with the description serve to explain certain principles thereof. In the drawing figures:

FIG. 1 is an interior side elevational view of the sliding door assembly illustrating, among other structures, the internal track provided in the bottom of the arm rest, the link arm that supports the track guide over which the internal track slides and the door body in the closed position.

FIGS. 2a-2c are schematic representations illustrating the door body in three separate operating positions. More specifically, FIG. 2a illustrates the door body in the closed position. FIG. 2b illustrates the door body in an intermediate or first opened position. FIG. 2c illustrates the door body in the second opened position.

Reference will now be made in detail to the present preferred embodiments of the sliding door assembly, examples of which are illustrated in the accompanying drawing figures.

DETAILED DESCRIPTION

Reference is now made to FIGS. 1 and 2a-2c which illustrate the new and improved sliding door assembly 10. As illustrated, the sliding door assembly 10 includes a door body 12. The door body 12 includes an arm rest 14. A track 16 is provided in the arm rest 14. In the illustrated embodiment, the track 16 is provided along a bottom portion of the arm rest 14 and the track opens downward. As a consequence, the track 16 is substantially concealed from view.

As further illustrated in FIG. 1, the sliding door assembly 10 includes a locking mechanism generally designated by reference numeral 18. In the illustrated embodiment, the locking mechanism 18 includes a first door lock 20, a second door lock 22 and an actuator handle 24. More specifically, the first door lock 20 includes a first striker 26 mounted to a support structure 28 of the motor vehicle and a latch mechanism, schematically illustrated at 30, carried on the door body 12. The second door lock 22 includes a second striker 32 carried on the structural pillar 34 and a cooperating second latch mechanism 36 carried on the door body 12. In the illustrated embodiment, the first door lock 20 is at the motor vehicle forward end of the door body 12 while the second door lock 22 is at the motor vehicle rearward end of the door body.

The sliding door assembly 10 also includes a link arm 38 having a proximal end pivotally connected to a support surface (in the illustrated embodiment, the structural pillar 34) by means of a hinge 40 and a distal end that carries a track guide 42.

The track guide 42 comprises a roller mechanism including a primary or first roller 44 that engages the track 16 and a secondary or second roller 46 that engages and rolls along the inner surface of the door body along the line 48. The link arm 38 and the hinge 40 are designed to carry the entire weight of the door body 12 and the hinge allows the link arm to pivot about the Z-axis between the home position illustrated in FIG. 2a and the door sliding position illustrated in FIGS. 2b and 2c.

As will be appreciated from the following description, the sliding door assembly 10 is displaceable between a closed position illustrated in FIG. 2a, an intermediate or first opened position illustrated in FIG. 2b and a fully or second opened position illustrated in FIG. 2c. The door body 12 may be displaced between these three positions because the track 16 is adapted to slide over the track guide 42.

As illustrated in FIG. 2a, when the door body 12 is in the closed position, the door body is aligned with the outer body panels 50 of the motor vehicle 52. In this position, the link arm 38 is aligned with the track 16 and the track guide 42 is positioned at the first end 54 of the track 16.

When one wishes to open the door body 12, one must first displace the door body from the closed position illustrated in FIG. 2a to the intermediate or first opened position illustrated in FIG. 2b. This is done by pushing the door body 12 outwardly in the direction of action arrow A. As illustrated, the link arm 38 pivots about the hinge 40 in the direction of action arrow B and also about the primary or first roller 44 in the direction of action arrow C. If desired, a spring 56 may be provided about the hinge 40 to bias (a) the link arm 38 from the home position to the door sliding position and (b) the door body 12 from the closed position to the intermediate or first opened position after the locking mechanism 18 is released by means of the actuator handle 24 carried on the door body 12.

Once the door body 12 is in the intermediate or first opened position illustrated in FIG. 2b, the door body may be displaced to the fully or second opened position illustrated in FIG. 2c by sliding the door body over the track guide 42 until the track guide is adjacent the second, opposite end 58 of the track 16 (note action arrow D). This allows one to access the interior 60 and rear seat 61 of the motor vehicle 52 through the door opening 62. As the primary or first roller 44 rides along the track 16 in the arm rest 14, the secondary or second roller 46 stabilizes the door body 12 by rolling along the inside surface of the door body at the line 48. This minimizes rotation of the door body 12 about the X-axis (fore-aft in vehicle) by countering the tendency of the door body to want to tip about the primary or first roller 44. As should be appreciated, both rollers 44, 46 of the track guide 42 are secured by rotation shafts to the solid, structural link arm 38.

When one wishes to close the door body 12, one initially slides the door body in the direction of action arrow E so that the door body is displaced from the fully, second opened position illustrated in FIG. 2c to the intermediate or first opened position illustrated in FIG. 2b. The door body 12 is then displaced laterally in the direction of action arrow F from the intermediate or first opened position illustrated in FIG. 2b to the closed position illustrated in FIG. 2a. The link arm 38 accommodates this movement through the hinge 40. The locking mechanism 18 and, more particularly, the forward door lock 20 and the rearward door lock 22 then latch to secure the door body 12 in the closed position.

As should be appreciated from reviewing FIGS. 1 and 2a, the track 16 in the bottom of the arm rest 14 is a track on the internal side of the door body 12 concealed from view by the door body when the door body is in the closed position. Accordingly, the motor vehicle 52 does not include any external telltale indicating that the door body 12 is part of a sliding door assembly 10. Accordingly, the exterior aesthetics for the motor vehicle 52 are significantly enhanced over prior art sliding door designs which incorporate an external guide track.

The foregoing has been presented for purposes of illustration and description. It is not intended to be exhaustive or to limit the embodiments to the precise form disclosed. Obvious modifications and variations are possible in light of the above teachings. For example, the illustrated embodiment is a manually operated sliding door assembly 10. It should be appreciated that the sliding door assembly 10 could also be powered. All such modifications and variations are within the scope of the appended claims when interpreted in accordance with the breadth to which they are fairly, legally and equitably entitled.

What is claimed:

1. A sliding door assembly, comprising:
   a door body including a track;
   a link arm connected to a support surface;
   a track guide carried on said link arm, said track guide having a roller mechanism including a first roller engaging in said track and a second roller engaging an inner face of said door body outside of said track;
   said track of said door body slides over said track guide as the door body is moved between open and closed positions; and
   wherein said door body includes an arm rest and said track is provided in said arm rest.

2. The sliding door assembly of claim 1, wherein said link arm is connected to said support surface by a hinge.

3. The sliding door assembly of claim 2, further including a spring biasing said link arm from a closed door position toward a door sliding position.

4. The sliding door assembly of claim 3, further including a locking mechanism wherein said locking mechanism includes an actuator handle carried on said door body for releasing a first door lock and a second door lock.

5. The sliding door assembly of claim 1, wherein said track is provided along a bottom portion of said arm rest and opens downward.

6. The sliding door assembly of claim 5, wherein said support surface is defined by a structural pillar of a motor vehicle.

7. The sliding door assembly of claim 6, further including a locking mechanism wherein said locking mechanism includes a first lock, a second lock and an actuator handle carried on said door body.

* * * * *